United States Patent [19]
Hyun et al.

[11] Patent Number: 5,737,362
[45] Date of Patent: Apr. 7, 1998

[54] DELAY-LOCKED LOOP CODE TRACKING SYSTEM FOR RECEIVER OF A CODE SPREAD COMMUNICATION SYSTEM

[75] Inventors: Jin-Il Hyun, Ne-Dong; In Kang, Eoeun-Dong; Jin-Jong Cha, Eoeun-Dong; Jae-Seok Kim, Eoeun-Dong; Kyung-Soo Kim, Dunsan-Dong, all of Rep. of Korea

[73] Assignee: Electronics and Telecommunications Research Institute, Daejeon-shi, Rep. of Korea

[21] Appl. No.: 684,790

[22] Filed: Jul. 22, 1996

[30] Foreign Application Priority Data

Dec. 18, 1995 [KR] Rep. of Korea .................. 1995-51479

[51] Int. Cl.$^6$ ............................................ H04L 27/30
[52] U.S. Cl. .................. 345/206; 345/346; 331/DIG. 2
[58] Field of Search ............................ 345/200, 206, 345/205; 331/DIG. 2; 375/340, 376; 329/304

[56] References Cited

U.S. PATENT DOCUMENTS

| | | | |
|---|---|---|---|
| 4,221,005 | 9/1980 | La Flame | 375/367 |
| 4,285,060 | 8/1981 | Cobb et al. | 375/200 |
| 4,550,414 | 10/1985 | Guinon et al. | 375/208 |
| 5,060,180 | 10/1991 | Kingston et al. | 364/724.03 |
| 5,105,436 | 4/1992 | Mori et al. | 375/200 |
| 5,299,229 | 3/1994 | Zscheile, Jr. et al. | 375/200 |
| 5,477,195 | 12/1995 | Spilker | 375/208 |

*Primary Examiner*—T. Ghebretinsae
*Attorney, Agent, or Firm*—Antonelli, Terry, Stout & Kraus, LLP

[57] ABSTRACT

The present invention provides a double delay-locked loop (DDLL) code tracking loop for spreading a linear section of an energy detecting area of the tracking loop by using several code time, and provides a delay-locked loop code tracking system for a receiver of a code spread communication system capable of performing an effective code tracking even when a changing ratio of a receiving path is large, by variably using a difference of a preceding time code and a delayed time code according to a change of a receiving environment being changed without cease. Accordingly, the code tracking loop of the present invention improves the receiver performance of the code spread radio communication system, and simplifies a structure of the receiver.

8 Claims, 6 Drawing Sheets

DELAY-LOCKED LOOP CODE TRACKING SYSTEM FOR RECEIVER OF A CODE SPREAD COMMUNICATION SYSTEM

BACKGROUND OF THE INVENTION

The present invention relates to a delay-locked loop code tracking system for a receiver of a code spread communication system, and more particularly to a code tracking system for effectively tracking a signal change for a receiving environment of the receiver in a code spread communication system of a code division multiple access (CDMA) mobile radio communication, a personal communication service (PCS), a satellite communication, and so on to thereby improve a performance of the receiver.

The receiver of a radio communication system should be able to easily adapt to a change in the environment of a radio line changing without ceasing operation. In mobile radio communication, a transmitter or the receiver moves quickly, and it is a necessary function to track the change of a reception signal in order to receive an effective signal. It is necessary that the receiver of the code spread communication system has a synchronizing tracking function for adapting to any change in the receiving environment. Generally, a tracking loop being used is a delay-locked loop (hereinafter, referred to as 'DDL') code tracking loop using the difference between reception signals of a preceding time code and a delay time code.

As a spread spectrum receiver related to the present invention, U.S. Pat. No. 5,060,180 discloses a method for improving the performance of the code tracking loop by using a loop filter of a DDL code tracking loop. Herewith, using a code, U.S. Pat. No. 5,299,229 discloses a code tracking system using a PN code having a high ratio and a PN code having a low ratio. This patent discloses a method for tracking the high ratio or low ratio PN code according to a data ratio in a code tracking for a variable system, as the high ratio or low ratio for the data ratio. A tracking loop for a spread spectrum communication receiver is disclosed in U.S. Pat. No. 5,105,436, and the code tracking loop disclosed in this patent uses a pattern matching circuit to be used for the spread spectrum communication receiver, and also uses a system for judging the presence or absence of a pulse by using two codes, thereby improving the processing gain of a tracking loop. Since the conventional DDL code tracking loop uses a fixed code time, there is the problem that effective code tracking cannot be performed in a midtown environment wherein a proximate multiplex path is often generated or when the changing ratio of a path caused by a quick speed of a mobile station is large.

In case of DDL according to conventional art, a linear section of a loop energy detecting area by a code error is limited according to a delay time of a used code. The bigger the time difference used for a correlation is in the receiver and in a code of the reception signal, the bigger the detected energy for correcting it should be. However, there is the problem that such linear section is only half of the delay time difference.

FIG. 1 shows the receiver of a general code spread radio communication system and a noncoherent system. Referring to FIG. 1 for operations checking, the reception signal is reverse-spread by the code generated by code generator 4 and by correlator 1 through code tracking loop 5 after correlation, and passes through an energy detector 2 for eliminating a phase element, and then is restored to transmitting data by transmitting data restorer 3. At this time, the code tracking loop generally uses a DDL system which utilizes an energy difference for the code preceding as much as $\Delta$ and the code delayed as much as $\Delta$, than a reference code. Generally, the difference A uses a period of $\frac{1}{2}$.

FIG. 2 shows the construction of a general DDL code tracking loop. In FIG. 2, the energy detectors 8 and 9 detect an energy wherein the phase element is eliminated, for a noncoherent demodulating style. An adder 11 gets the difference of the energy reverse-spread by the code preceding as much as $\Delta$ and the energy reverse-spread by the code delayed as much as $\Delta$. An output of the adder 11 appears as $G(\tau/Tc)$, and for $\tau/Tc$ an estimated error is normalized as Tc of a code period, and it becomes an expression of $\Delta/k=\frac{1}{2}$. Such case appears as a graph shown in FIG. 3. Herewith, the estimated error $\tau$ appears in $\tau=TD-Td^\wedge$ as the difference of a propagation delay as Td and an estimation of Td as Td$^\wedge$. The error energy detected in the adder 11, namely the energy detected by the difference of the code of the reception signal and the code used for the reverse-spread of reception signal of the receiver, passes through a Voltage controlled oscillator (VOC) 13 through the loop filter 12, generally as low-pass or band-pass filters. Then the error energy is input to the code generator 14 and moves a state of the code generator in the direction in which it becomes an expression of $\tau=Tc-0$ in FIG. 3. That is, when the code of reception signal is earlier than the code to be used is output from the code generator 14, the tracking loop quickens the state movement of the code generator 14 thereby moving in a direction coinciding with the code state of the reception signal. When the code of reception signal is later than the output code of the code generator 14, the tracking loop moves in a same direction that the state of the code generator 14 moves later, and therefore the code state of the reception signal and the state of code generator 14 of the receiver coincide. As described above, the tracking loop tracks the change of the code state caused by the various changes of a receiving path so that the state of code generator of the receiver may coincide with the code state of the reception signal.

FIG. 3 shows an S curved line of DDL as described above, and as afore-mentioned, a period as $-0.5<\tau/TC<0.5$ has a linearity which $G(\tau/Tc)$ is proportioned to $\tau/Tc$. However, when the period is $0.5<\tau/Tc$ and the period is $\tau/Tc<-0.5$, in spite of the absolute value of $\tau/Tc$ increasing, there is a characteristic that the absolute value of $G(\tau/Tc)$ decreases. This is to violate the linearity of the absolute value of $G(\tau/Tc)$ increasing according to an increase of the absolute value of $\tau/Tc$. Such general DDL maintains linearity in the period of $\tau/Tc<\Delta/Tc$ whose $\tau/Tc$ is the absolute value herewith, but moves in the decreasing direction in the period of $\tau/Tc>\Delta/Tc$ whose $\tau/Tc$ is the absolute value herewith. Due to such a phenomenon, the performance of the tracking loop is limited, and when the speed of a moving body is fast or a near path difference occurs, there is the problem that code synchronization is impossible. Accordingly, for the code spread radio communication system, in the receiver demodulating a transmitting signal, it is necessary for the code synchronization to match the spread code of a transmitter and the synchronism thereof. Also, in a variable channel environment a synchronizing tracking function for maintaining such code synchronism is indispensable.

In accordance with the above-mentioned problems, it is necessary for the code tracking loop to maintain the code synchronism even in a midtown environment, when speed of mobile station is quick or the near path difference frequently occurs, by spreading the linear section thereby by improving the performance of the code tracking loop.

SUMMARY OF THE INVENTION

It is therefore, an object of the present invention to provide a double delay-locked loop(hereinafter, referred to as 'DDLL') code tracking loop for spreading a linear section of an energy detecting area of a tracking loop by code time of several numbers.

It is another object of the present invention to provide a variable delay-locked loop code tracking loop capable of performing effective code tracking even when a changing ratio of a receiving path is large, by variably using a difference of a preceding time code and a delayed time code according to a change of a receiving environment being changed without ceasing the transmission.

The present invention for achieving the above objects, in the code tracking loop for effectively tracking a signal change due to a changing receiving environment for a receiver of a code spread communication system, includes a code generating unit for generating a code having numerous time differences; a correlating unit for performing a correlation of an input reception signal and numerous outputting codes output from the code generating unit and performing a code reverse-spread function for a code-spread signal and transmitted in a transmitter; a square computing unit formed in numerous numbers, for eliminating a phase element of the reception signal through a square computation of the reception signal output from the correlating unit; an error energy detecting unit for receiving an energy of a signal reverse-spread by a code preceded as much as $\Delta$ and $2\Delta$ and an energy of a signal reverse-spread by a code delayed as much as $\Delta$ and $2\Delta$ and then for detecting an error energy; a loop filter for changing an output of the error energy detecting unit to a stabilized signal; and a voltage controlling oscillator for receiving the output of the loop filter and controlling a code generating speed of the code generating unit so that a code of the reception signal and an output code of the code generating unit may coincide. When the linear section of the tracking loop is wide, the present invention has a characteristic that effective code synchronization and code maintenance is available even in a midtown environment when the speed of a mobile body is fast or a near path difference occurs frequently.

The present invention for achieving another object is constructed by including a correlating unit for performing the correlation between the input reception signal and an output code of a code deciding unit and performing the code reverse-spread function for the signal code-spread and transmitted in the transmitter; an adding unit for getting a difference of an early time code and a late time code output from the correlating unit; a loop filter for changing an output received from the adding unit to the stabilized signal; a gain controlling unit for controlling a gain of an outputting value of the loop filter according to the output of the code deciding unit; a voltage controlling oscillator for receiving an output of the gain controlling unit, controlling the code generating speed of the code generating unit so that the code of the reception signal and the output code of the code generating unit may coincide; the code generating unit for generating a plurality of codes according to a code speed controlled by the voltage controlling oscillator; an energy detecting unit for detecting the reception energy, comparing with a previous reception signal energy and outputting a state of a radio channel to a code detecting unit; and the code deciding unit for deciding the early code and a relatively late code among the output of the code generating unit on the basis of the output result of the energy detecting unit, outputting it to the correlating unit, controlling the gain of the tracking loop and outputting a controlling gain value to the gain controlling unit.

Accordingly, the present invention variably uses the difference of the preceding time code and the delayed time code to thereby perform the effective code tracking when the changing ratio of the reception path is large.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

Figure 1:
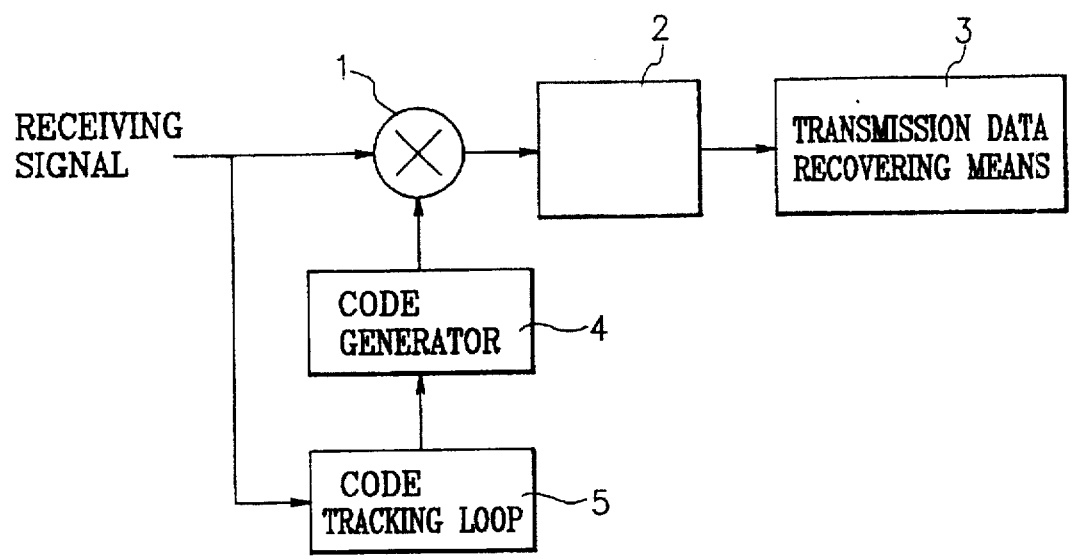
FIG. 1 is a block diagram of noncoherent reception of a code spread communication system.

In the following description, specific details are set forth to provide a more thorough understanding of the present invention. It will be apparent, however, to one skilled in the art, that the present invention may be practiced without these specific details. In other instances well known circuits have not been described so as not to obscure the present invention.

The preferred embodiment of the present invention is illustrated in detail referring to the drawings, as follows.

Figure 4:
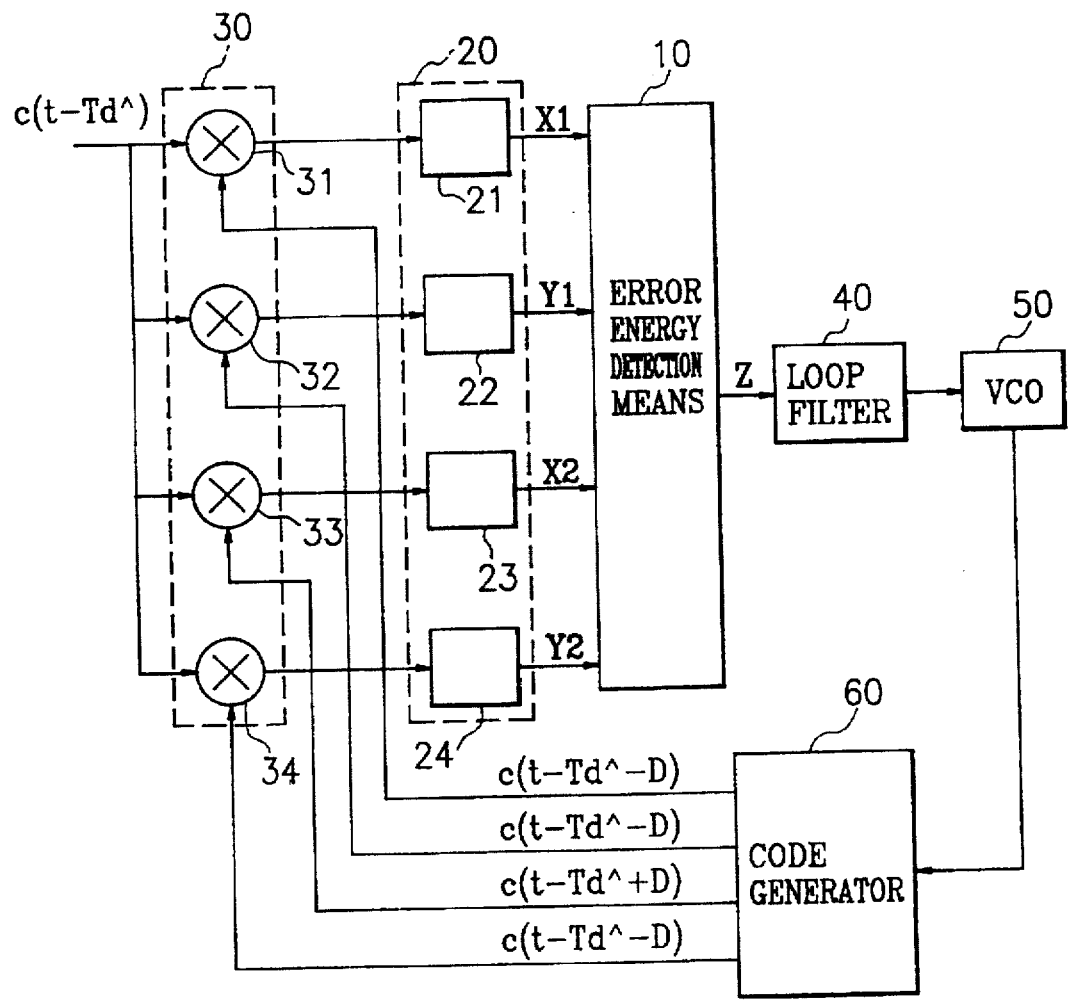
FIG. 4 is a block diagram of a double delayed-locked loop (DDLL) code tracking loop according to one embodiment of the present invention.
Figure 5:
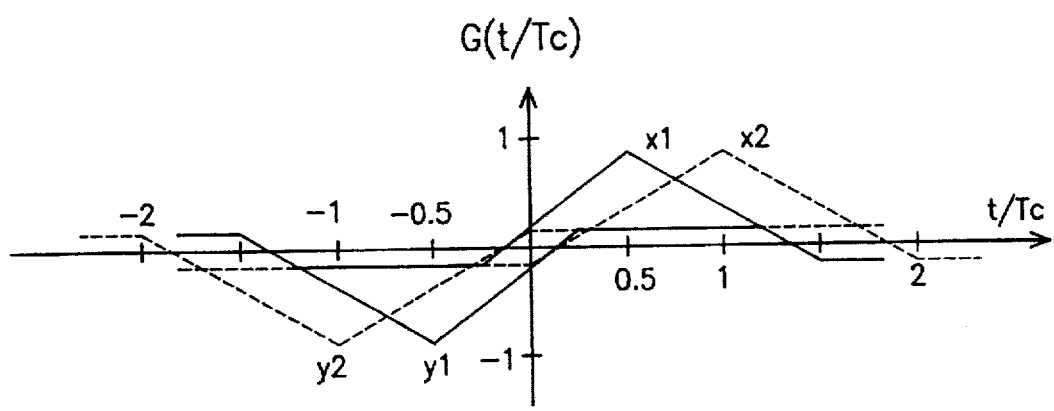
FIG. 5 is a waveform diagram of signals X1, Y1, X2 and Y2 for $\tau/Tc$.

FIG. 4 is a block diagram showing construction of a double delay-locked loop(hereinafter, referred to as 'DDLL') code tracking loop according to one embodiment of the present invention. X1 and X2 in FIG. 4 are, respectively, energy of a signal reverse-spread by a code preceded as much as $\Delta$ and $2\Delta$ as a period by more than $c(t-Td^\wedge)$ as a reference code of a code generator 60. Y1 and Y2 are respectively the energy of a signal reverse-spread by a code delayed as much as $\Delta$ and $2\Delta$ as a period by more than $c(t-Td^\wedge)$ as the reference code of the code generator 60. In case of "$\Delta/Tc\ \frac{1}{2}$", signals X1, Y1, X2 and Y2 are drawn as a graph of an energy value for $\Delta/Tc$ normalized as Tc and it shows in FIG. 5. In FIG. 5, Y1 and Y2 appear as shapes inverted against an X axis. Referring to FIG. 5, the construction of FIG. 4 as one preferred embodiment of the present invention is illustrated as follows.

A DDLL code tracking loop is constructed by a code generator 60 for generating ($c(t-Td^\wedge-D)$, $c(t-Td^\wedge+D)$, $c(t-Td^\wedge-2D)$, $c(t-Td^\wedge+2D)$) as a code having numerous time differences; a correlating part constructed from a first correlator 31 to a fourth correlator 34, for performing a correlation of an input reception signal as $c(t-Td^\wedge)$ of a reference code and numerous outputting codes output from the code generator 60 and performing a code reverse-spread function for a signal code-spread and transmitted in a transmitter not shown in FIG. 4; a square computing part 20 formed from a first square computer 21 to a fourth square computer 24, for eliminating a phase element of a reception signal through a square computation of the reception signal output from numerous correlators; an error energy detector 10 for receiving X1 and X2 as an energy of a signal reverse-spread by (c(t−Td^−D), c(t−Td^−2D)) as a code preceded as much as Δ and 2Δ, which is output from the first square computer 21 and the third square computer 23, and for receiving Y1 and Y2 as an energy of a signal reverse-spread by (c(t−Td^+D), c(t−Td^+2D) as a code delayed as much as Δ and 2Δ, which is output from the first square computer 21 and the third square computer 23, and then for detecting an error energy; a loop filter 40 for changing an output of the error energy detector 10 to a stabilized signal; and a voltage controlling oscillator 50 for receiving the output of the loop filter 40 and controlling a code generating speed of the code generator 60 so that a code of the reception signal and an output code of the code generator 60 may coincide, that is synchronize.

Operations by the above construction are illustrated as follows. Numerous correlators, namely from the first correlator 31 to the fourth correlator 34, perform the correlation of c(t−Td^) as a reception signal input and (c(t−Td^−D), c(t−Td^+D), c(t−Td^−2D), c(t−Td^+2D)) as numerous codes generated from the code generator 60, and perform the code reverse-spread function for the signal code-spread and transmitted in the transmitter. Numerous square computers, namely from the first square computer 21 to the fourth square computer 24, compute the energy for an energy detection receiving system without requiring phase synchronism in a noncoherent receiving system. That is, through a square computation of the signal, the square computers eliminate the phase element of the reception signal. The loop filter 40 changes the output of the error energy detector 10 to the stabilized signal to supply it to the voltage controlling oscillator 50. The voltage controlling oscillator 50 receives the output of the loop filter 40 and controls the code generating speed of the code generator 60 so that the code of reception signal and the output code of code generator 60 may synchronize. That is, when the output of the loop filter 40 is 0, the voltage controlling oscillator 50 generates the code generating speed of code generator 60 as a normal code ratio, and when the output of loop filter 40 is a positive value, the voltage controlling oscillator 50 generates the code generating speed of code generator 60 relatively later than the normal code ratio so that the output of loop filter 40 may be converged to 0. Also when the output of loop filter 40 is a negative value, the voltage controlling oscillator 50 generates the code generating speed of code generator 60 relatively earlier than the normal code ratio so that the output of loop filter 40 may be converged to 0.

Figure 6:
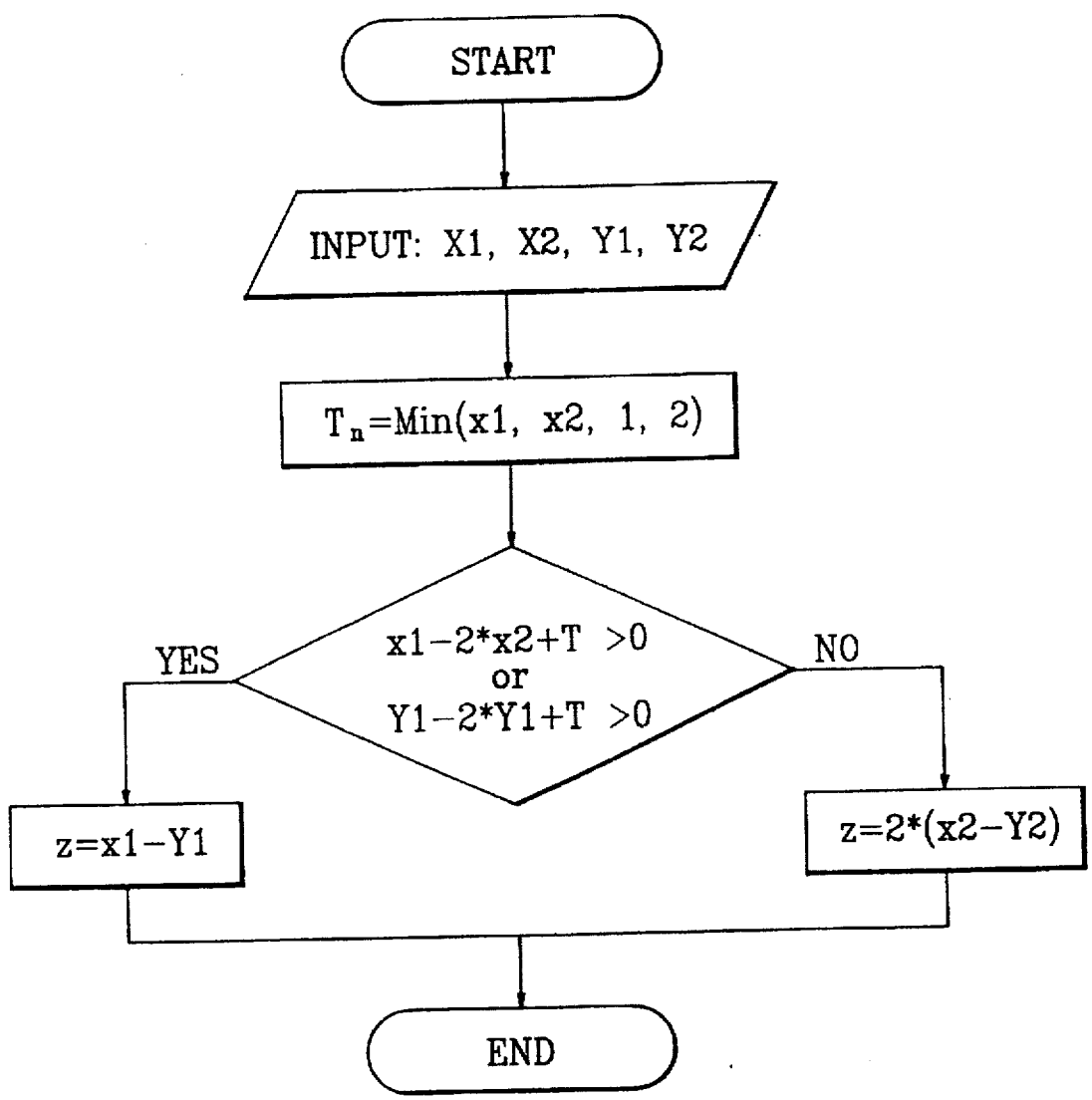
FIG. 6 is a flow diagram for an operation of an error energy detector shown in FIG. 5.
Figure 7:
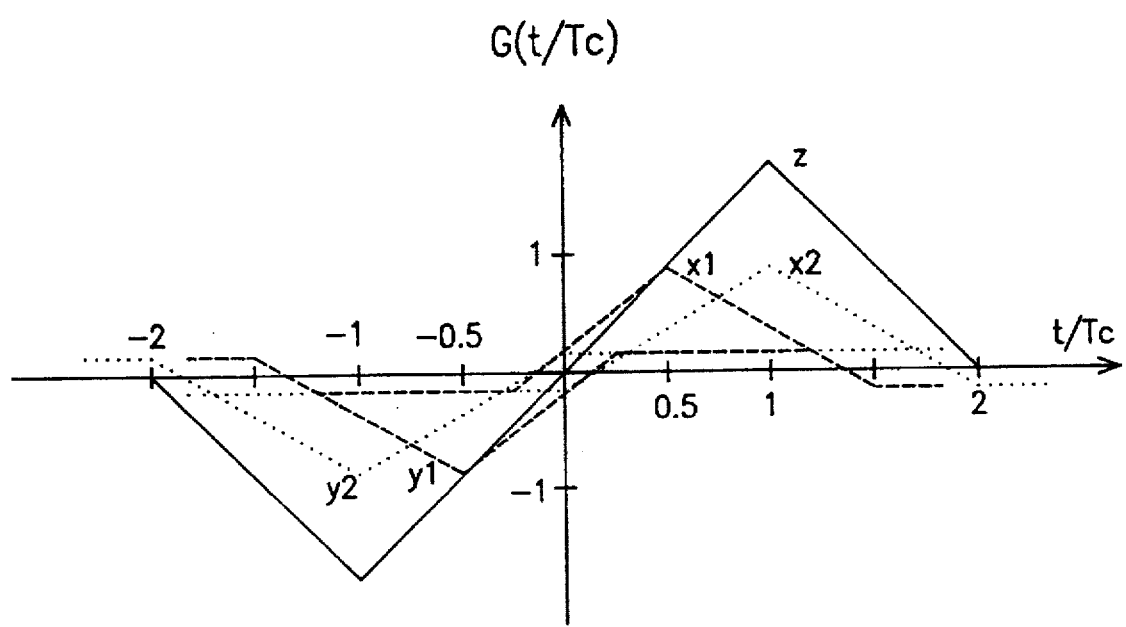
FIG. 7 is a waveform diagram for an output signal of the error energy detector.

The error energy detector 10 receives the signal of X1, Y1, X2 and Y2, and is a signal processor having a characteristic such as Z(X1−Y1, 2,(X2−Y2)) of FIG. 7, and it is same as the flow diagram of FIG. 6. In FIG. 6, $T_h$ appears as output energy of the correlator by a white noise element and appears as low noise energy appearing in all areas not synchronizing to the signal. In FIG. 6, as a method for getting $T_h$, the minimum value among X1, X2, Y1 and Y2 is used, but the method for getting it can be done in several ways and it can be received with an average of two minimum values among X1, X2, Y1 and Y2. After getting the white noise energy by using the minimum value out of the above X1, X2, Y1 and Y2, it is determined whether an expression X1−2*X2+$T_h$>0 or Y1−2*Y1+$T_h$>0 is satisfied or not, and if it is satisfied, the output Z of the error energy detector is determined by an expression Z=X1−Y1, and if it is not satisfied, the output Z of the error energy detector is determined by an expression Z=2*(X2−Y2). As above-mentioned, adding the output Z of the error energy detector in FIG. 5, it is like FIG. 7.

Figure 3:
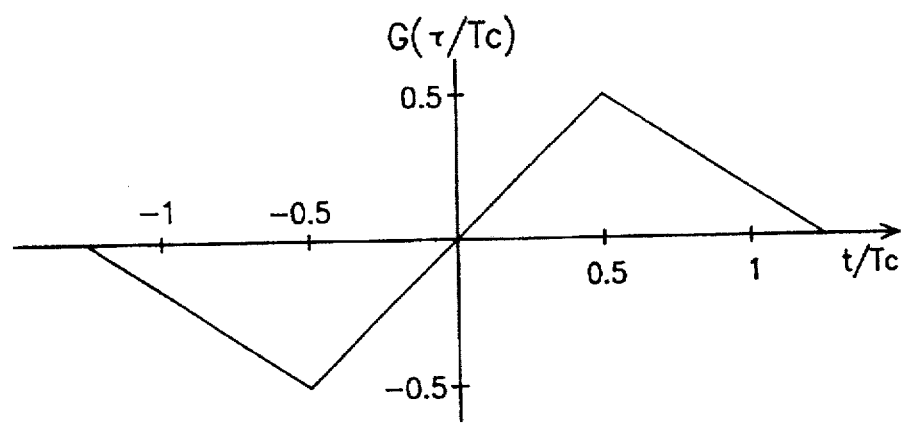
FIG. 3 is a view showing an S curved line of DDL shown in FIG. 2.

In FIG. 7 a linearity of the detecting energy for τ/Tc is spread twice as much than in FIG. 4. Such linearity spread makes the effective code tracking and the code synchronizing maintenance easy even when the code changing of the reception signal is large because of the change of the radio channel environment or a quick movement of the transmitter. Using the correlator having several code states different from one another with the method shown in the above FIGS. 4, 6 and 7, a loop gain using a pair of the preceded-delayed codes is determined, and also the linearity can design the tracking loop spread by several multiples. When the changing ratio of the path is large due to the quick speed of the moving body, or when the midtown environment the near multipath occurs frequently, the linearity spread of a curved line S of the tracking loop shown in FIG. 3 is not sufficient. Therefore, the second embodiment of the present invention is illustrated referring to FIG. 8.

Figure 8:
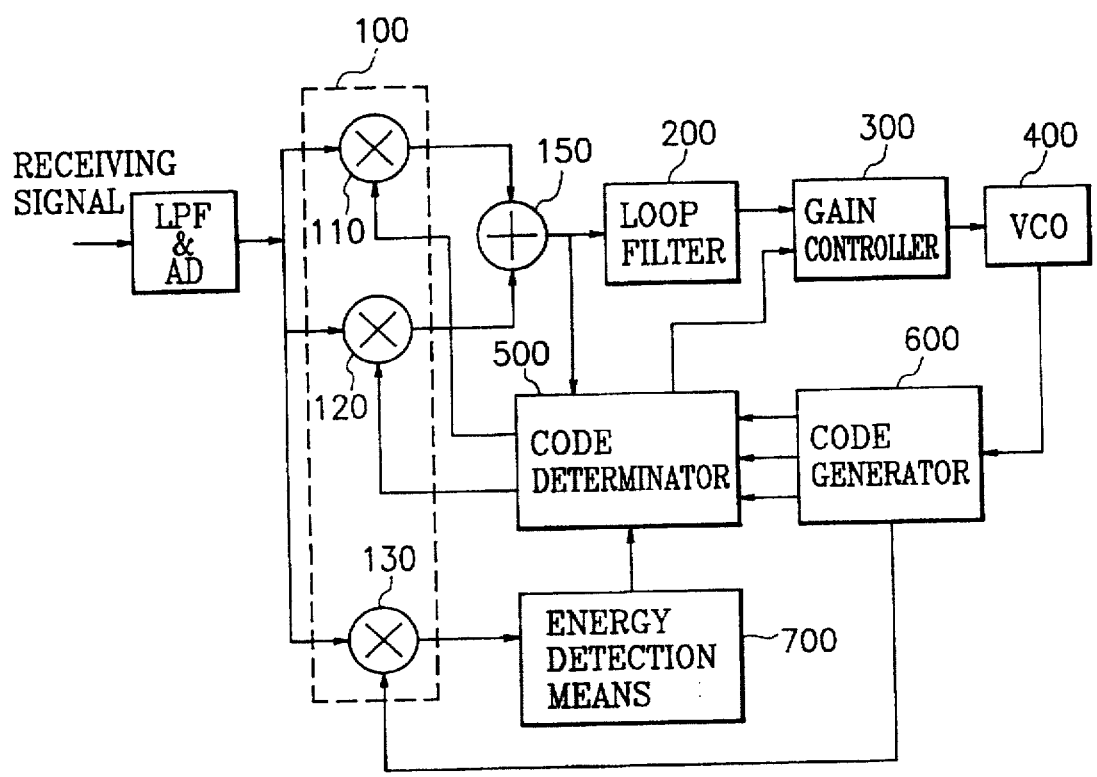
FIG. 8 is a block diagram of DDLL code tracking system according to a second embodiment of the present invention.

FIG. 8 shows a variable DDL code tracking loop capable of varying the code used for the tracking loop according to the receiving environment. Such a variable DDL code tracking loop variably uses the difference of the preceding time code and the delayed time code according to the change of receiving environment, and thereby can perform effective code tracking even when the changing ratio of the receiving path is large. The construction of the variable DDL code tracking loop by such design method is illustrated referring to FIG. 8.

FIG. 8 has a correlating part 100 formed by correlators including fifth correlator 110 to seventh correlator 130, for performing the correlation between the reception signal input through a low-pass filter and an A/D converter 90, and an output code of a code decider 500, and for performing the code reverse-spread function for the signal spread and transmitted in the transmitter not shown in FIG. ; an adder 150 for determining the difference of the early time code and the late time code output from the fifth and sixth correlators 110 and 120; a loop filter 200 for changing the output received from the adder/subtractor 150 to the stabilized signal; a gain controller 300 for controlling a gain of an outputting value of the loop filter 200 according to the output of the code decider 500; a voltage controlling oscillator (VCO) 400 for receiving an output of the gain controller 300, controlling the code generating speed of the code generator 600 so that the code of the reception signal and the output code of the code generator 600 may coincide; the code generator 600 for generating three codes according to a code speed controlled by the voltage controlling oscillator 400; a seventh correlator 130 set within the correlating part 100, for performing the correlation between the signal received through the low-pass filter and the A/D converter 90, and a signal output from the code generator 600; an energy detector 700 for detecting the reception energy by the correlation performing of the seventh correlator 130, comparing with a previous reception signal energy and outputting a state of a radio channel to the code decider 500; and the code decider 500 for deciding an early code and a relatively late code among the output of the code generator 600 on the basis of the output result of the energy detector 700, outputting it to the fifth correlator 110 and the sixth correlator 120, controlling the gain of the tracking loop and outputting a controlling gain value to the gain controller 300.

With the above-mentioned construction, operations of the code tracking loop according to the second embodiment of the present invention are illustrated as follows. The fifth and sixth correlators 110 and 120 within the correlating part 100 perform the correlation between the reception signal input and the output code decided from the code decider 500, and perform the code spread function for the signal passing through the low-pass filter and A/D converter (LPF & AD) 90, code-spread and transmitted in the transmitter. The loop filter 200 changes an output, which is the output of the fifth and sixth correlators 110 and 120 by an early code and a late code and is subtracted by the adder/subtractor 150, namely as a correlating output by the early code, the correlating output by the late code or the output by its opposition, to the stabilized signal, and then the loop filter 200 transmits it to the gain controller 300. The gain controller 300 controls the gain of an output value of the loop filter 200 according to the output of the code decider 500 and supplies it to the voltage controlling oscillator 400. The voltage controlling oscillator 400 receives the output of the gain controller 300, controls the code generating speed of the code generator 600, and performs the function that the code of the reception signal and the output code of the code generator 600 synchronize. The output of the gain controller 300 is converged to zero, and when the output of the gain controller 300 is a negative value, the voltage controlling oscillator 400 generates the code generating speed of code generator 600 earlier than the normal code ratio thereby performing the function that the output of the gain controller 300 is converged to zero.

The seventh correlator 130 performs the correlation of the reception signal received through the low-pass filter and the A/D converter 90 and the signal received from the code generator 600. The energy detector 700 detects a reception energy from the signal correlated by the seventh correlator 130, compares it with the previous reception signal energy and supplies the state of the radio channel to the code decider 500. Herewith, the comparison with the previous reception signal energy is fundamentally based on the correlation characteristic that the output of the seventh correlator 130 in the code spread system is a pulse formation. That is, the output of the seventh correlator 130 when the code synchronization is made exactly has a big value corresponding to a peak of the pulse, meanwhile the output of the correlator when the code synchronization is not made has a low value corresponding to a noise element.

The code decider 500 decides the early code and the late code among the outputs of code generator 600 on the basis of the result of the energy detector 700, and supplies it to the fifth and sixth correlators 110 and 120. That is, the difference between the early code and the late code is indicated as ½, 1, 2 or an optional N code. The code decider 500 transmits the controlling gain value to the gain controller 300 controlling the gain of the tracking loop. When the reception energy falls largely by a generation of a time difference between the code of reception signal and the output code of the code generator 600, the code generator 600 makes the difference between the early code and the late code large, thereby increasing the range of a trackable code, and performs an operation for transmitting a big controlling gain value to the gain controller 300, thereby a significantly increased gap between the reception signal code and the output code of code generator 600 coincides quickly. On the contrary, when the reception energy increases rapidly by synchronizing nearly the reception signal code and the output code of code generator 600, the code generator 600 decreases the difference between the early code and the late code large, thereby reducing the range of the trackable code, and performs an operation for reducing the controlling gain value transmitted to the gain controller 300, and thereby stability and sensitivity of the tracking loop are increased.

When using the difference of the conventional fixed early code and late code, there can be a failure in the signal tracking, for the reception input signal having the change of a bigger path difference than the difference of the early code and the late code. However, by using variably the difference of the early code and the late code, the code tracking does not fail even when the change of path difference of the reception signal is large.

As above-mentioned, the code synchronization is necessary in the receiver of the code spread radio communication system and is important for directly influencing the performance of the system. Therefore, in the receiver the synchronization tracking function for adapting to the change of the variable channel environment is important.

The present invention as afore-mentioned variably uses the difference between the preceding time code and the delayed time code according to the change of receiving environment, thereby even when the changing ratio of reception path is large, there is an advantage that the effective code tracking can be performed is provided by using the code having several time differences and by using the method for enlarging the linear section of energy detecting area of the tracking loop.

Accordingly, the performance improvement of the code tracking loop improves the receiver performance of the code spread radio communication system, and there is the effective in simplifying a structure of the receiver.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

Figure 2:
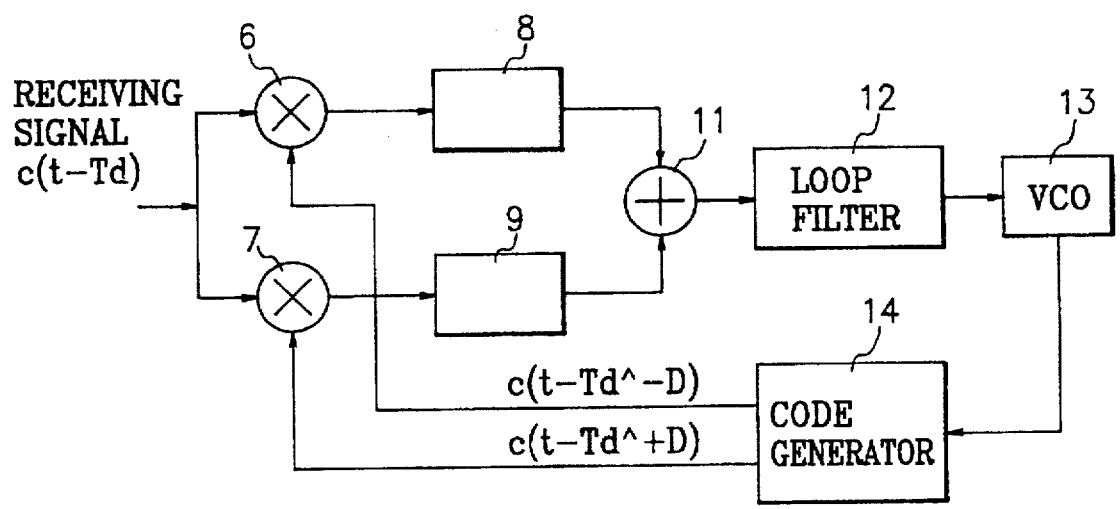
FIG. 2 is a block diagram of a conventional DDL code tracking system.

In the drawings:

| FIG. 1: | 3 - transmitting data restorer |
| --- | --- |
| | 4 - code generator |
| | 5 - code tracking loop |
| FIG. 2: | 12 - loop filter |
| | 14 - code generator |
| FIG. 4: | 10 - error energy detector |
| | 40 - loop filter |
| | 50 - voltage controlling oscillator |
| | 60 - code generator |
| FIG. 8: | 200 - loop filter |
| | 300 - gain controller |
| | 500 - code decider |
| | 600 - code generator |
| | 700 - energy detector |

What is claimed is:

1. A code tracking loop in a double delay-locked loop code tracking system for a receiver of a code spread communication system, comprising:

a code generating unit for generating a code having numerous time differences;

a correlating unit for correlating an input reception signal and numerous outputting codes output from said code generating unit and performing a code reverse-spread function for a signal code-spread and transmitted from a transmitter;

a plurality of square computing units for eliminating a phase element of received signals through a square computation of the signals output from said correlating unit;

an error energy detecting unit for receiving an energy of a signal reverse-spread by a code preceded by as much as $\Delta$ and $2\Delta$ and the energy of the signal reverse-spread by a code delayed by as much as $\Delta$ and $2\Delta$ and then for detecting an error energy, wherein $\Delta$ is 1/N code period (N being an integer);

a loop filter for changing an output of said error energy detecting unit to a stabilized signal; and a voltage controlling oscillator for receiving the output of said loop filter and controlling a code generating speed of said code generating unit so that a code of the reception signal and an output code of the code generating unit coincide.

2. The code tracking loop as claimed in claim 1, wherein said correlating unit comprises:

a first correlator for performing the correlation of the reception signal and the code preceded by as much as more than a period $\Delta$ than a reference code;

a second correlator for performing the correlation of the reception signal and the code delayed by as much as more than the period $\Delta$ than the reference code;

a third correlator for performing the correlation of the reception signal and the code preceded by as much as more than a period $2\Delta$ than the reference code; and a fourth correlator for performing the correlation of the reception signal and the code delayed by as much as more than the period $2\Delta$ than the reference code.

3. The code tracking loop as claimed in claim 1, wherein said square computing units comprise:

first and third square computers for respectively outputting a signal energy reverse-spread by the code preceded by as much as the period $\Delta$ and the period $2\Delta$; and second and fourth square computers for respectively outputting the signal energy reverse-spread by the code delayed by as much as the period $\Delta$ and the period $2\Delta$.

4. A code tracking loop for a receiver of a code spread communication system, comprising:

a correlating unit for performing a correlation between an input reception signal and an output code of a code determining unit and performing a code reverse-spread function for a signal spread and transmitted in a transmitter;

an adding unit for adding a difference of an early code and a late code output from said correlating unit;

a loop filter for stabilizing an output of said adding unit;

a gain controlling unit for controlling a gain of an output value of said loop filter according to the output of said code determining unit;

a voltage controlling oscillator for receiving the output of said gain controlling unit and controlling a code generating speed of a code generating unit so that a code of the reception signal and an output code of the code generating unit coincide;

the code generating unit for generating a plurality of codes according to a code speed controlled by said voltage controlling oscillator; and an energy detecting unit for detecting a received energy, comparing the received energy with a previous reception signal energy and outputting a state of a radio channel to the code determining unit; and wherein said code determining unit determines an early code and a relatively late code among the outputs of said code generating unit on the basis of an output result of said energy detecting unit for outputting thereof to said correlating unit, controlling the gain of the tracking loop and outputting a controlling gain value to said gain controlling unit.

5. The code tracking loop as claimed in claim 4, wherein said correlating unit comprises:

a first correlator for performing the correlation of the reception signal and an earlier code than said reception signal determined by said code determining unit;

a second correlator for performing the correlation of the reception signal and a later code than said reception signal determined in said code determining unit; and a third correlator for performing the correlation of the reception signal and the output code generated in said code generating unit.

6. The code tracking loop as claimed in claim 4, wherein said voltage controlling oscillator generates the code generating speed of said code generating unit as a normal code ratio when the output of said gain controlling unit is zero.

7. The code tracking loop as claimed in claims 4 or 6, wherein said voltage controlling oscillator generates the code generating speed of said code generating unit later than the normal code ratio so that the output of said gain controlling unit converges to zero when the output of said gain controlling unit is a positive value.

8. The code tracking loop as claimed in claims 4 or 6, wherein said voltage controlling oscillator generates the code generating speed of said code generating unit, earlier than the normal code ratio so that the output of said gain controlling unit converges to zero when the output of said gain controlling unit is a negative value.

* * * * *